(12) United States Patent
Raghothaman

(10) Patent No.: US 6,947,707 B2
(45) Date of Patent: Sep. 20, 2005

(54) APPARATUS, AND ASSOCIATED METHOD, FOR VERIFYING CLOSED-LOOP FEEDBACK ANTENNA WEIGHTINGS AT A COMMUNICATION STATION UTILIZING TRANSMIT DIVERSITY

(75) Inventor: Balaji Raghothaman, Irving, TX (US)

(73) Assignee: Nokia Corporation, Espoo (FI)

( * ) Notice: Subject to any disclaimer, the term of this patent is extended or adjusted under 35 U.S.C. 154(b) by 786 days.

(21) Appl. No.: 09/896,241

(22) Filed: Jun. 29, 2001

(65) Prior Publication Data

US 2003/0003873 A1 Jan. 2, 2003

(51) Int. Cl.⁷ .................................................. H04L 1/02
(52) U.S. Cl. ..................................... 455/67.1; 455/503
(58) Field of Search ................................ 455/503–506, 455/67.1

(56) References Cited

U.S. PATENT DOCUMENTS 5,488,635 A * 1/1996 Chennakeshu et al. ...... 375/340
6,452,981 B1 * 9/2002 Raleigh et al. .............. 375/299
2002/0009156 A1 * 1/2002 Hottinen et al.
2002/0131490 A1 * 9/2002 Allpress et al.
2002/0141486 A1 * 10/2002 Bottomley et al.

* cited by examiner

Primary Examiner—WIlliam J. Deane, Jr.

(57) ABSTRACT

Apparatus, and associated method, verifies values of antenna weightings used to weight transmit signals transmitted by a base transceiver station which utilizes transmit diversity. Verification is performed at a mobile station which receives transmit signals sent by the base transceiver station. Sequence estimation is provided by a sequence estimator which thereby verifies the values of the feedback information. Once verified, the values are returned to the base transceiver station and are utilized to adjust the weightings of the antennas for subsequently-communicated signals by the base station. The use of sequence estimation permits improved accuracy of verification of the values of the antenna weightings.

20 Claims, 2 Drawing Sheets

APPARATUS, AND ASSOCIATED METHOD, FOR VERIFYING CLOSED-LOOP FEEDBACK ANTENNA WEIGHTINGS AT A COMMUNICATION STATION UTILIZING TRANSMIT DIVERSITY

The present invention relates generally to a manner by which to verify the weights of closed loop antenna weightings used at a sending station which utilizes transmit diversity, such as a base transceiver station of a 3G-WCDMA (third-generation, wideband code-division multiple-access) cellular communication system. More particularly, the present invention relates to apparatus, and an associated method, by which the antenna weightings are verified by use of a sequence estimation technique at a receiving station, such as a mobile station operable in the 3G-WCDMA system. Improved accuracy of verification of the values of the antenna weightings is provided. Through operation of an embodiment of the present invention, distortion caused, e.g., by feedback error is less likely to prevent accurate verification of values of the antenna weightings in contrast to conventional manners which independently verify each value of the instructions.

BACKGROUND OF THE INVENTION

A communication system is formed, at a minimum, of a sending and a receiving station. The sending and receiving stations are interconnected by way of a communication channel. Information to be communicated by the sending station is sent upon the communication channel to the receiving station. A wide variety of different types of communication systems have been developed and implemented to effectuate communication of information between the sending and the receiving stations.

A radio communication system is a type of communication system in which the communication channel interconnecting the sending and receiving stations is formed of a radio channel defined upon a portion of the electromagnetic spectrum. Because a radio channel is utilized to form a communication link between the sending and receiving stations, a wired connection, conventionally required in a wireline communication system, is obviated. Through the use of a radio channel upon which to communicate communication signals between the sending and receiving stations, communications are effectuable at, and between, positions at which the formation of wireline connections would be impractical.

A cellular communication system is a type of radio communication system, and is regularly utilized by large numbers of consumers to communication both voice and nonvoice information. Cellular communication systems have been installed throughout wide geographical areas and have achieved wide levels of usage. A cellular communication system generally includes a fixed network infrastructure including a plurality of fixed-site base transceiver stations. The fixed-site base transceiver stations are installed at selected positions throughout a geographical area which is to be encompassed by the communication system. The fixed network infrastructure of which the base transceiver stations form portions is coupled to a public network, such as a PSTN (public-switched, telephonic network) or packet data backbone. Correspondent nodes are coupled to the public network. Portable transceivers, referred to as mobile stations, communicate with the base stations by way of radio links forming portions of the electromagnetic spectrum.

Locations at which to install the fixed-site base stations are carefully selected so that a mobile station is within communication range of at least one base transceiver station when the mobile station is positioned at any location within the geographical area to be encompassed by the cellular communication system. A cellular communication system is relatively bandwidth efficient. That is to say, the portion of the electromagnetic spectrum allocated to the communication system upon which to define radio channels is relatively efficiently utilized. Through appropriate positioning of the base transceiver stations, only low-power signals are required to be generated. And, the same radio channels can be reused at different locations throughout the geographical area encompassed by the communication system. The ability to reuse the same radio channels permits the efficient utilization of the allocated spectrum.

Ideally, distortion is not introduced upon a communication signal during its communication upon a radio, or other, communication channel. That is to say, ideally, a communication signal is identical in value subsequent to its communication upon the communication channel to its value prior to communication upon the channel.

However, in a nonideal communication system in which the communication signal is transmitted upon a nonideal communication channel, the signal is distorted during its communication upon the communication channel. The distortion of the communication signal caused during its propagation upon the communication channel causes dissimilarities to result. If the distortion is significant, the informational content of the communication signal can not be accurately recovered subsequent to communication upon the communication channel.

For instance, fading caused by multi-path transmission might distort the communication signal. If significant levels of fading are exhibited, the informational content of a communication signal might be unrecoverable.

Various techniques are utilized to overcome distortion introduced upon a communication signal as a result of transmission upon a nonideal communication channel, such as a communication channel which exhibits fading.

Transmit diversity, for instance, is utilized to combat the effects of fading. Time-encoding of a signal, prior to its transmission upon the channel, is sometimes utilized to counteract the distortion introduced upon the signal. Time-encoding increases the redundancy of the signal. By increasing the time redundancy, the likelihood that the informational content of the signal can be recovered, subsequent to its communication upon the communication channel, is increased. Introducing time redundancy into the signal is sometimes referred to as creating time diversity.

Utilization of space diversity is also sometimes utilized to overcome distortion introduced upon the communication signal. Typically, space diversity refers to the utilization of more than one transmit antenna transducer from which a communication signal is transmitted, thereby to provide spatial redundancy. The antenna transducers are typically separated by distances great enough to ensure that the signals communicated by the respective antenna transducers fade in an uncorrelated manner.

Combinations of both space and time diversity are sometimes utilized together. Transmit diversity to combat signal fading can be further enhanced.

When space diversity is utilized, signal applied to the separate antenna transducers are weighted in manners to facilitate communication of the communication signal. Different weightings can be applied to different ones of the antenna transducers.

Closed-loop feedback of information related to the weightings to be applied to the separate antenna transducers has been proposed. A proposed cellular communication system, referred to as a 3G-WCDMA (third generation, wideband code division multiple access) sets forth a system in which transmit diversity is utilized by the base transceiver stations operable therein. Closed-loop feedback of weighting information is returned by the mobile station to the base transceiver station. Weighting values are adjusted responsive to the feedback information.

The bandwidth available on the reverse link, feedback path between the mobile station and the base transceiver station is, however, severely limited. In one proposal, only a single bit of feedback data is able to be sent by the mobile station to the base transceiver station every fifteen milliseconds (ms). The feedback is highly quantized; hence, its resolution is quite limited. Set partitioning of the feedback, along with filtering of the feedback, has been proposed to increase the constellation size for the transmit weights.

A single feedback bit can be used to provide relative phase weightings between, e.g., two transmit antennas in a two-antenna transmit array. The single feedback bit necessitates only a two-point constellation in the feedback of the phase indication.

The use of filtered feedback modes can compensate for this limitation. Here, the acutual, subsequent transmit weighting selected responsive to the feedback is a function of more than one feedback weight. Also, phase constellations corresponding to the feedback bits differ in even and odd slots. That is, set partitioning is thereby done on a four-point constellation.

Feedback verification, however, is a problem associated with closed-loop transmit diversity communication schemes, including that proposed for the 3G-WCDMA cellular communication system. The feedback path extending from the mobile station to the base transceiver station is not distortion-free. Disotortion creates discrepancies between the expected and actual transmit weights.

Dedicated pilot symbols are inserted into the data communicated upon a traffic channel and are used to verify downlink weighting values. Slot-by-slot verification is to be utilized. However, prior errors in the verification affect a current weight estimation. Thus verification error is propagated in successive estimations.

An improved manner by which to verify the antenna weighting values detected at the mobile station, or other receiving station, is therefore required.

It is in light of this background information related to communication systems which utilize transmit diversity that the significant improvements of the present invention have evolved.

SUMMARY OF THE INVENTION

The present invention, accordingly, advantageously provides apparatus, and an associated method, by which to verify the weights of the antenna weightings used at a sending station which utilizes transmit diversity, such as a base transceiver station operable in a 3G-WCDMA (third generation wideband code-division multiple access) cellular communication system.

Through operation of an embodiment of the present invention, the antenna weightings are verified by use of a sequence estimation technique, at a receiving station, such as a mobile station operable in the 3G-WCDMA system. Improved accuracy of verification of the values of the antenna weightings is provided.

Sequence estimation is utilized to verify the values of the antenna weightings applied to downlink signals sent by the sending station. Improved accuracy of verification is possible, in contrast to conventional manners by which to verify the values of the antenna weightings. Distortion, such as fading, upon a feedback path upon which the feedback instructions are communicated resulting in prior feedback errors is not propagated in subsequent verifications in contrast to conventional manners requiring independent verification of each value of the closed-loop feedback instructions.

In one aspect of the present invention, communication signals are generated by a first communication station and transmitted to a second communication station upon a forward link of a radio link formed between the first communication station and a second communication station. Transmit diversity is utilized by the first communication station through the use of separate antenna transducers to transduce the communication signal upon, preferably, uncorrelated paths to the second communication station. A second communication station performs measurements to verify antenna weightings used at the separate antenna transducers. Once verified, appropriate changes are made in the weightings of the antenna transducers at the first communication station. The changes, when implemented, permit improvement of the signal quality of the subsequently-communicated communication signals by the first communication station to the second communication station. The determinations made at the second communication station are returned, by way of a feedback path on a reverse link to the first communication station. The feedback, when detected at the first communication station, is utilized to adjust the weightings at the separate antenna transducers.

As the communication resources allocated to the communication of the feedback information are limited, any channel disruption, such as deep fades exhibited on the feedback path, causes the feedback information to be susceptible to distortion. Operation of an embodiment of the present invention verifies the values of the feedback information detected at the first communication station through the use of both a memory component and a current component. Because a memory component is utilized in the verification of the value of the feedback information, distortion introduced upon the feedback path is less likely to result in improper verification of feedback values.

In another aspect of the present invention, a sequence estimator is utilized to verify values of the antenna weightings. The sequence estimator is formed of a trellis matrice formed of a plurality of states. Each state includes allowable values of the antenna weightings. One of the states forms a most-recent state, and others of the states define states prior to the most-recent state. A branch metric is calculated through the trellis matrice of an optimal length. The optimal length path forms the path metric which defines the values of the antenna weightings. The path metric is defined by both prior states and the most recent state and, thereby, is formed of a memory component and a current component.

In one implementation, sequence estimation is utilized to verify filtered transmit diversity weights in a 3G-WCDMA communication system. Single-bit values are returned by a mobile station to a base transceiver station to instruct the base transceiver station of antenna weightings to be applied at the antenna transducers of the base transceiver stations. The sequence estimation is performed at the mobile station to verify values of the antenna weightings and utilizes a trellis matrice which is based upon a MAP matrice. A branch metric is calculated through the trellis to determine an optimal length path. The optimal length path is utilized in the determination of verification of the feedback values of the filtered transmit diversity weights.

In these and other aspects, therefore, apparatus, and an associated method, is provided for a communication system having a first communication station for communicating a communication signal to a second communication station. The communication signal is weighted at the first communication station with a first antenna weight for communication to the second communication station by way of a first channel path. The communication signal is weighted at the first communication station with a second antenna weight for communication to the second communication station by way of a second channel path. Closed-loop values indicative of the first antenna weight and the second weight are verified at the second communication station. A sequence estimator is coupled to receive indications of the communication signal indicative of the first and second antenna weights. The sequence estimator estimates values of the first antenna weight and of the second antenna weight of the communication signal, thereby to verify values of the first antenna weight and the second antenna weight. The estimated values formed by the sequence estimator are selected responsive to both a memory component and a current component.

A more complete appreciation of the present invention and the scope thereof can be obtained from the accompanying drawings which are briefly summarized below, the following detailed description of the present-preferred embodiments of the invention and the appended claims.

DETAILED DESCRIPTION OF THE INVENTION

Figure 1:
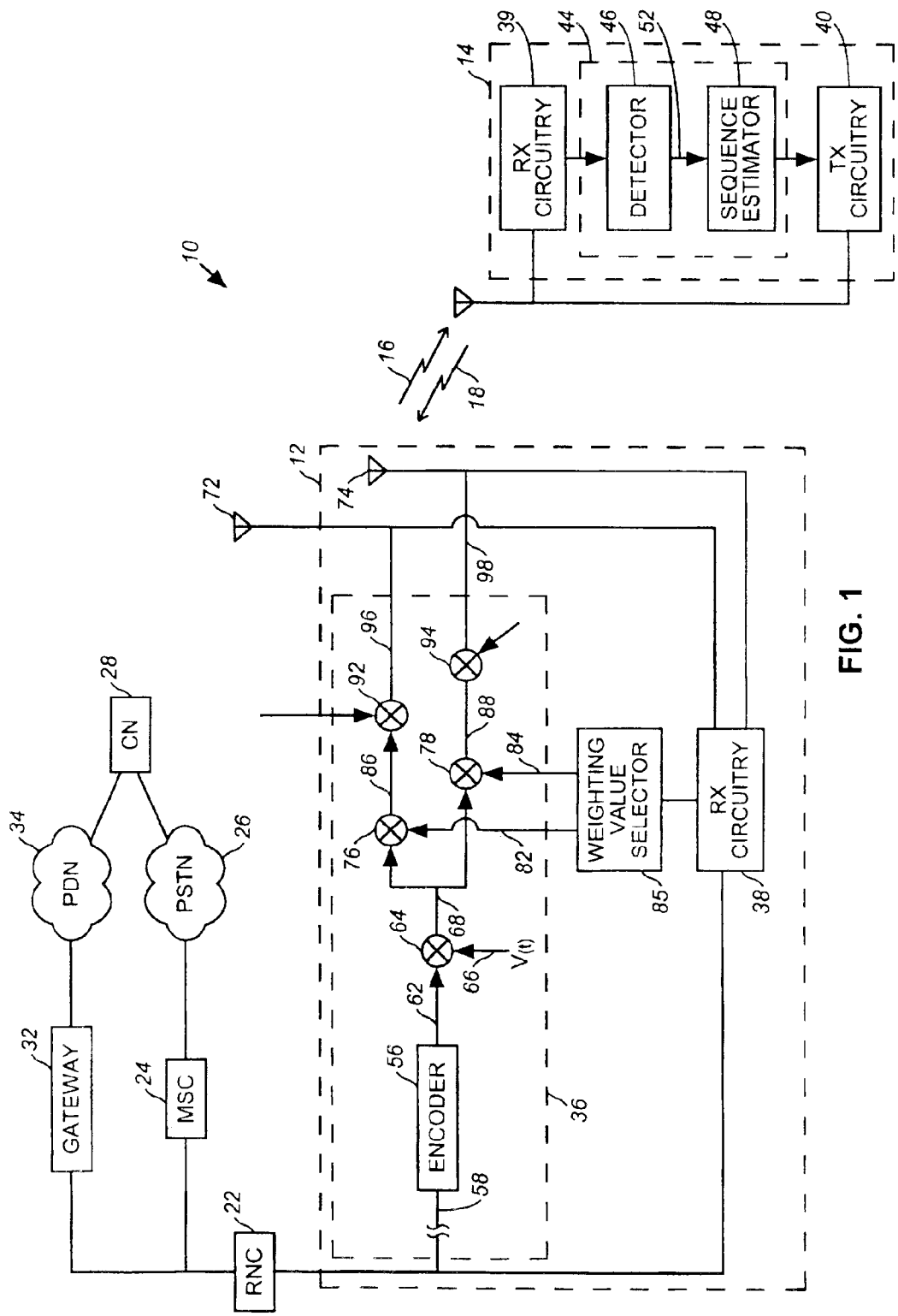
FIG. 1 illustrates a functional block diagram of a communication system in which an embodiment of the present invention is operable.

Referring first to FIG. 1, a communication system, shown generally at 10, provides for radio communications between two communication stations, here a base transceiver station (BTS) 12 and a mobile station 14. Radio links are formed between the base station and the mobile station, and communication channels are defined thereon. Communication signals are communicated between the base station and the mobile station upon the communication channels to effectuate communications between the base transceiver station and the mobile station.

In the exemplary implementation shown in the figure, the communication system 10 forms a cellular communication system operable generally pursuant to a CDMA (code-division, multiple-access) communication scheme, such as a proposed 3G-CDMA (third generation, CDMA) communication standard. It should be understood at the outset, however, that operation of an embodiment of the present invention is similarly also possible in other types of radio, and other, communication systems in which closed-loop feedback information is provided between communication stations. Therefore, while the following description shall describe operation of an embodiment of the present invention with respect to a 3G-CDMA communication system in which antenna weighting feedback information is provided by a mobile station to a base transceiver station in which transmit diversity is utilized, operation of an embodiment of the present invention can analogously be described with respect to any of various other types of communication systems to verify values of antenna weightings.

In operation of the communication system 10, two-way communications are permitted between the base transceiver station and the mobile station. Forward link signals, generated by the base station, are communicated to the mobile station upon forward link channels defined upon a forward link 16 extending between the base and mobile stations. And, reverse link signals generated at the mobile station are communicated to the base station upon reverse link channels defined upon a reverse link 18 extending between the mobile station and the base transceiver station.

For the purpose of describing operation of an embodiment of the present invention, the base transceiver station is operable to transmit traffic signals upon forward link channels defined upon the forward link 16 and the mobile station is operable to return closed-loop feedback information upon reverse link channels defined upon the reverse link 18 which forms a feedback path in a closed-loop control scheme.

As shall be noted more fully below, the base transceiver station utilizes transmit diversity in which the signals transmitted upon the forward link channels are transduced by two, or more, spaced-apart antenna transducers. The signals transduced by the separate antenna transducers are first weighted with antenna weightings of selected weighting values. And the feedback information returned by the mobile station includes indications of changes in values of the antenna weightings to facilitate improved communications. Communications upon the forward and reverse links are susceptible to distortion, caused, e.g., by fading conditions.

The base transceiver station 12 is here shown to be coupled to a radio network controller (RNC) 22. The radio network controller is operable, amongst other things, to control operation of the base transceiver station. The radio network controller, in turn, is coupled to a mobile switching center (MSC) 24. And, the mobile switching center is coupled to the public-switched, telephonic network (PSTN) 26. A correspondent node (CN) is coupled to the PSTN. A communication path is formable between the correspondent node and the mobile station to permit communications to be effectuated therebetween.

The base station controller is further shown to be coupled to a gateway 32. The gateway is coupled to a packet data backbone 34, such as the internet backbone. And, the correspondent node 28 is further shown to be coupled to the packet data backbone. A communication path is formable between the correspondent node and the mobile station also to permit packet data communications to be effectuated with the mobile station.

The base transceiver station 12 includes both a transmit portion, represented by transmit circuitry 36, and a receive portion, represented by receive circuitry 38. A forward link signal to be communicated by the base transceiver station to the mobile station is converted into form to permits its communication upon the forward link 16 by the transmit circuitry. And, closed-loop feedback information returned the by mobile station to the base station, as well as other reverse-link communication signals, are received by, and, as appropriate, operated upon, the receive circuitry 38.

The mobile station 14 also includes a receive portion, represented by the receive circuitry 39 and a transmit portion, represented by the transmit circuitry 40. The receive circuitry is operable to receive, and operate upon, forward link signals transmitted by the base station. And, the transmit circuitry is operable to transmit reverse link signals upon the reverse link to the base transceiver station.

The mobile station further includes apparatus 44 of an embodiment of the present invention as a portion thereof. The apparatus includes elements which are represented functionally. In the exemplary implementation, the elements forming the apparatus 44 are formed, at least in part, by algorithms executable by a processing device. In other implementations, the elements forming the apparatus 44 are implemented in other manners. The apparatus 44 is coupled to both the receive circuitry 39 and to the transmit circuitry 40. During operation, the apparatus 44 verifies antenna weighting values of the forward link signals received by the receiver circuitry. Namely, dedicated pilot symbols are inserted into the traffic channel and used in the verification of the antenna weightings. The antenna weightings are selected to facilitate, for instance, maximization of the power levels of the communication signal, when received at the mobile station, and the verification is performed pursuant to a closed-loop scheme to optimize the power levels of the communication signal.

The apparatus 44 is here shown to include a detector 46 which is coupled to the receive circuitry. The detector is operable to detect, and to extract values of, selected portions of the communication signal transmitted by the base station to the mobile station of the antenna weightings to be utilized for subsequent communications by the transmit portion of the base station.

The detector 46 is coupled to a sequence estimator 48 by way of the line 52. The sequence estimator is operable to verify the values of the antenna weighting values based upon the indications provided to the sequence estimator on the line 52.

The transmit circuitry 36 of the base transceiver station here further illustrates a portion of the transmit path including an encoder 56 which encodes data provided thereto by the way of the line 58 to form encoded data on the line 62. The line 62 is coupled to a first input terminal of an up-mixer 64. An up-mixing signal v(t) is applied to a second input terminal of the up-mixer 64 by way of the line 66. An up-mixed signal is formed by the up-mixer on the line 68.

Two-antenna transmit diversity is utilized at the base transceiver station. Here, a two-antenna transducer arrangement is shown, having a first antenna transducer 72 and a second antenna transducer 74. In other implementations, other numbers of antenna transducers are utilized.

The line 68 includes separate branches for applying the up-mixed signal to each of the antenna transducers. The upper (as shown) branch of the line 68 is coupled to a weighting element 76, and a lower (as shown) branch of the 68 is coupled to an input terminal of a weighting element 78. Lines 82 and 84 are also coupled to the weighting elements 76 and 78. The lines 82 and 84 extend from a weighting value selector 85 at which weighting values are selected. The selector 85 is coupled to the receiver circuitry 38 to receive the feedback information related to the weighting values returned by the mobile station 14. Weighting values verified by the sequence estimator 48 and returned to the base transceiver station 12 are thereby utilized to weight the up-mixed signals provided to the weighting elements 76 and 78 on the upper and lower branches of the line 68.

Weighted communication signals formed by the weighting elements 76 and 78 are generated on the lines 86 and 88, respectively. Amplification of the weighted signals is represented by the elements 92 and 94. Amplification values are also provided to the elements 92 and 94, indicated by the arrows extending to the respective elements. And, amplified, weighted communication signals are generated on the lines 96 and 98 for application to the antenna transducers 72 and 74, respectively.

Verification of the values of the closed-loop feedback information performed by the sequence estimator 48 of the mobile station permits accurate values to be ascertained and applied to the weighting elements in closed-loop fashion even when channel conditions upon the feedback path exhibit distortion, such as fades. Operation of the sequence estimator reduces the propagation effects of prior erroneous values used to form the weighting values. The verification of the values is dependent upon both current and prior values of the indications applied to the sequence estimator.

The values are detected by the detector 46 and applied to the sequence estimator 48. Verification of the values of the antenna weightings used in the just-received forward link signal is performed by the sequence estimator. During operation of the sequence estimator, the inherent memory in the filtering of the weights is utilized. There are $P=2^{N+1}$ possible states of transmit weights for an antenna transducer, each corresponding to a sequence of N feedback phases. N is the depth of the filter. These states are divided into two sets of P/2 slots due to the set-partitioned nature of the feedback constellation. $S_A$ refers to the possible states during an even slot, and $S_b$ denotes the possible states during an odd slot.

Some of these states might correspond to the same transmit weights w, but such states shall be considered distinct states. At some even time K, each of the possible states, $S_a(k)$ has as its parent, one of two possible states selected from the set of $S_b(k-1)$ in a prior slot. The two paths leading into a particular state $S_a(k)$ are denoted by $m_1$ and $m_2$.

Figure 2:
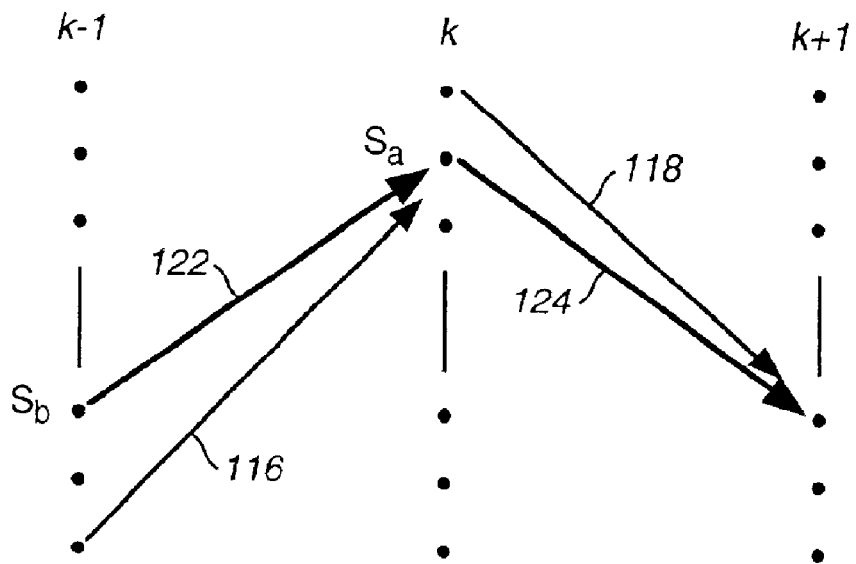
FIG. 2 illustrates a trellis matrix defined pursuant to operation of an embodiment of the present invention.

FIG. 2 illustrates a trellis matrice 112 which forms a portion of a sequence estimator 48. The matrice 112 is represented by an array including columns designated by k−1, k, and k+1. The three columns are representative of states at times k−1, k, and k+1. Point $S_b$ is represented at state k−1 and point $S_a$ is represented at the state k.

A cumulative MAP path metric of the two paths is given by the equation METRIC $(m_1)$+C and METRIC $(m_2)$+C where C is a branch metric corresponding to a state $S_a(k)$:

$$C=(2\gamma/\sigma^2)Re[h_d h_c^* w^*_{t,k}].$$

The value of w is based upon the state for which the metric is calculated, and p is the probability corresponding to the last feedback phase that leads to the state. Based upon the optimal length of the two path metrics leading into $S_a(k)$, a parent state is selected. The corresponding link as well as the total path metric is recorded. Segments 116 and 118 shown in the figure are representative of discarded paths, and the segments 122 and 124 are representative of paths of greatest total metrics. The total path metric and corresponding link is maintained for each possible state at each time slot, and the trellis 112 is constructed therefrom. Decisions on the values on the transmitted feedback weights are made by tracing back the path with a current optimal, e.g., maximum, metric by a specific number of slots t, referred to as the trace back length.

Figure 3:
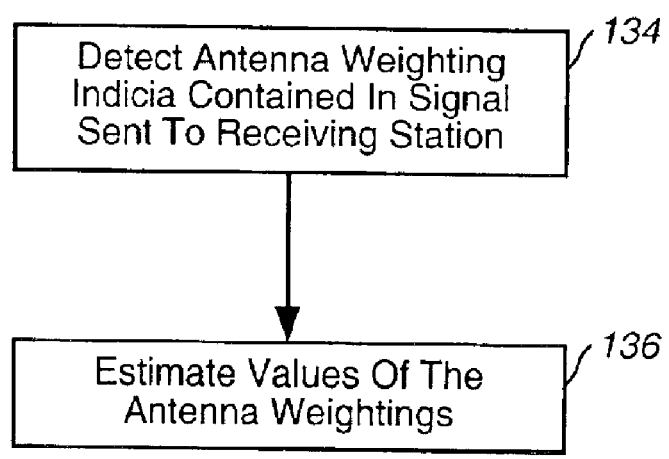
FIG. 3 illustrates a method flow diagram listing the method of operation of an embodiment of the present invention.

FIG. 3 illustrates a method, shown generally at 132, of an embodiment of the present invention. The method is operable to verify values of antenna weightings of signals sent to a second communication station by a first communication station. First, and as indicated by the block 134, antenna weighting indicia of the signals included in the signals sent to the second communication station are detected, once received at the second communication station. Then, and as indicated by the block 136, the values of the received, antenna weightings, indicated by the antenna weighting indicia, are estimated. Such estimation verifies the values. Sequence estimation is utilized to estimate the values. Through the use of sequence estimation, better verification of the antenna weightings used at the sending station is possible.

The preferred descriptions are of preferred examples for implementing the invention, and the scope of the invention should not necessarily be limited by this description. The scope of the present invention is defined by the following claims.

What is claimed is:

1. In a communication system having a first communication station for communicating a communication signal to a second communication station, the communication signal weighted at the first communication station with a first weight for communication to the second communication station by way of a first channel path and weighted at the first communication station with a second weight for communication to the second communication station by way of a second channel path, an apparatus for verifying values indicative of the first weight and the second weight, said apparatus comprising:

a sequence estimator coupled to receive indications of a transmitted portion of the communication signal, once received at the second communication station, said sequence estimator for estimating estimated values of the first weight and of the second weight by which the transmitted portion of the communication signal is weighted, the estimated values formed by said sequence estimator selected responsive to both a memory component and a current component, the estimated values verifying the values indicative of the first weight and the second weight, said sequence estimator comprising a trellis matrice defining a plurality of states, each state formed of allowable values of said first and second weights, and wherein the estimated values formed by said estimator are formed by a branch metric extending through the trellis matrice, said branch metric being determined with reference to a signal-to-noise ratio.

2. The apparatus of claim 1 wherein the current component responsive, in part, to which said sequence estimator selects the estimated values of the first weight and of the second weight comprises most-recent values indicative of the first and second antenna weights.

3. The apparatus of claim 1 wherein the memory component responsive, in part, to which said sequence estimator selects the estimated values of the first weight and of the second weight comprises at least one set of values indicative of the first and second weights prior to the most-recent values.

4. The apparatus of claim 1 further comprising a detector positioned at the second communication station, said detector for detecting indicia of the transmitted portion of the communication signal communicated to the second communication station.

5. The apparatus of claim 1 wherein a first state defined by the trellis matrice of said sequence estimator defines a most recent state.

6. The apparatus of claim 5 wherein states defined by the trellis matrice other than the first state define states prior to the most-recent state.

7. The apparatus of claim 1 wherein the branch metric by which the estimated values are formed by said estimator comprises an optimal length branch metric.

8. The apparatus of claim 1 wherein the trellis of said sequence estimator utilizes MAP metrics to determine the branch metric.

9. The apparatus of claim 1 wherein the communication system comprises a radio communication system which utilizes WCDMA (wideband code division multiple access) communication techniques and wherein the values to which said sequence estimator is coupled to receive indications thereof comprise values of the first and second antenna weights, respectively, indicative of weightings by which to weight a WCDMA signal which forms the communication signal.

10. The apparatus of claim 9 wherein the radio communication system comprises a cellular communication system wherein the first communication station comprises a cellular base transceiver station, wherein the second communication station comprises a mobile station, and wherein the closed-loop values to which said sequence estimator is coupled to receive indications thereof comprise pilot symbol values.

11. The apparatus of claim 10 wherein the indications of the values to which said sequences estimator is coupled to receive are representative of closed-loop values when received at the mobile station.

12. The apparatus of claim 10 wherein the estimated values formed by said sequence estimator are used by the mobile station to decode the transmitted portion of the communication signal.

13. In a method for communicating in a communication system having a first communication station for communicating a communication signal to a second communication station, the communication signal weighted at the first communication station with a first weight for communication to the second communication station by way of a first channel path and weighted at the first communication station with a second weight for communication to the second communication station by way of a second channel path, a method for verifying values indicative of the first weight and the second weight, said method comprising:

detecting, at the second communication station, indications of a transmitted portion of the communication signal, once received at the second communication station;

estimating estimated values of the first weight and of the second weight by which to weight the communication signal is weighted, the estimated values selected responsive to both a memory component and a current component, the estimated values verifying the values indicative of the first weight and the second weight;

forming a trellis matrice defined by a plurality of states, each state formed of allowable values of said first and second weights; and forming said estimated values by a branch metric extending through the trellis matrice, said branch metric being determined with reference to a ratio of traffic channel amplitude to the amplitude of the pilot channel.

14. The method of claim 13 wherein the current component of the estimated values estimated during said operation of estimating comprises most-recently detected values detected most-recently during said operation of detecting.

15. The method of claim 13 wherein the memory component of the estimated values estimated during said operation of estimating comprises at least one set of values indicative of the first and second weights prior to the most-recent values.

16. The method of claim 13 wherein said operation of estimating comprises forming a maximum length branch metric through said trellis matrice.

17. The method of claim 13 wherein the values indicative of the first and second weights, indications of which are detected during said operation of detecting, are communicated to the second communication station by the first communication station and comprise pilot symbols.

18. The method of claim 13 wherein the communication system comprises a radio communication system operable pursuant to a WCDMA (wideband code division multiple access) communication scheme, wherein the first communication station comprises a base transceiver station and the second communication station comprises a mobile station and wherein said operations of detecting and estimating are performed at the mobile station.

19. The method of claim 13 wherein said branch metric comprises an optimal length branch metric.

20. In a communication system having a first communication station for communicating a communication signal to a second communication station, the communication signal weighted at the first communication station with a first weight for communication to the second communication station by way of a first channel path and weighted at the first communication station with a second weight for communication to the second communication station by way of a second channel path, an apparatus for verifying values indicative of the first weight and the second weight, said apparatus comprising:

a sequence estimator coupled to receive indications of a transmitted portion of the communication signal, once received at the second communication station, said sequence estimator for estimating estimated values of the first weight and of the second weight by which the transmitted portion of the communication signal is weighted, the estimated values formed by said sequence estimator selected responsive to both a memory component and a current component, the estimated values verifying the values indicative of the first weight and the second weight, said sequence estimator comprising a trellis matrice defining a plurality of states, each state formed of allowable values of said first and second weights, and wherein the estimated values formed by said estimator are formed by a branch metric extending through the trellis matrice, said branch metric being determined with reference to the equation:

$$C=(2\gamma/\sigma^2)Re[h_d h_c^* w^*_{l,k}].$$

* * * * *